United States Patent
Leeder et al.

(10) Patent No.: US 9,087,363 B2
(45) Date of Patent: Jul. 21, 2015

(54) METHODS, SYSTEMS, AND COMPUTER READABLE MEDIA FOR MANAGING MULTIPLE PERSONAS WITHIN END USER APPLICATIONS

(75) Inventors: Michael Leeder, Stittsville (CA); Carroll Louise Gray-Preston, Morrisville, NC (US); James Angus McEachern, Stittsville (CA); Richard C. Taylor, Manotick (CA)

(73) Assignee: GENBAND US LLC, Frisco, TX (US)

(*) Notice: Subject to any disclaimer, the term of this patent is extended or adjusted under 35 U.S.C. 154(b) by 610 days.

(21) Appl. No.: 13/221,398

(22) Filed: Aug. 30, 2011

(65) Prior Publication Data
US 2013/0054701 A1 Feb. 28, 2013

(51) Int. Cl.
*G06F 13/00* (2006.01)
*G06Q 50/00* (2012.01)

(52) U.S. Cl.
CPC ........................... *G06Q 50/01* (2013.01)

(58) Field of Classification Search
CPC ................................................. G06Q 50/01
USPC ................... 709/204–206; 715/748–759
See application file for complete search history.

(56) References Cited

U.S. PATENT DOCUMENTS

| | | | |
|---|---|---|---|
| 6,199,099 B1 * | 3/2001 | Gershman et al. | 709/203 |
| 7,636,751 B2 * | 12/2009 | Weaver et al. | 709/204 |
| 7,636,755 B2 * | 12/2009 | Blattner et al. | 709/206 |
| 7,685,237 B1 * | 3/2010 | Weaver et al. | 709/205 |
| 8,037,150 B2 * | 10/2011 | Weaver et al. | 709/207 |
| 8,204,273 B2 * | 6/2012 | Chambers et al. | 382/103 |
| 8,250,144 B2 * | 8/2012 | Blattner et al. | 709/204 |
| 2005/0108329 A1 * | 5/2005 | Weaver et al. | 709/204 |
| 2006/0179410 A1 * | 8/2006 | Deeds | 715/750 |
| 2009/0141939 A1 * | 6/2009 | Chambers et al. | 382/103 |
| 2010/0005520 A1 | 1/2010 | Abbot et al. | |
| 2010/0169801 A1 * | 7/2010 | Blattner et al. | 715/758 |
| 2010/0332326 A1 | 12/2010 | Ishai | |
| 2011/0138171 A1 | 6/2011 | Yildiz | |
| 2012/0150960 A1 * | 6/2012 | Nalawade | 709/204 |

FOREIGN PATENT DOCUMENTS

CA 2 671 329 A1 1/2011

* cited by examiner

*Primary Examiner* — Kenneth R Coulter
(74) *Attorney, Agent, or Firm* — Fogarty, L.L.C.

(57) ABSTRACT

Methods, systems, and computer readable media for managing multiple personas within end user applications are disclosed. According to one method, a first profile definition defining a first persona through which a user accesses at least one social networking, OTT, or other hosted service and at least one trigger condition associated with the activation of the first persona is accessed. The method further includes determining a context for the user. The method further includes determining whether the context for the user satisfies the at least one trigger condition. In response to determining that the context satisfies the at least one trigger condition, the first persona is activated.

22 Claims, 18 Drawing Sheets

1800

1700

2300

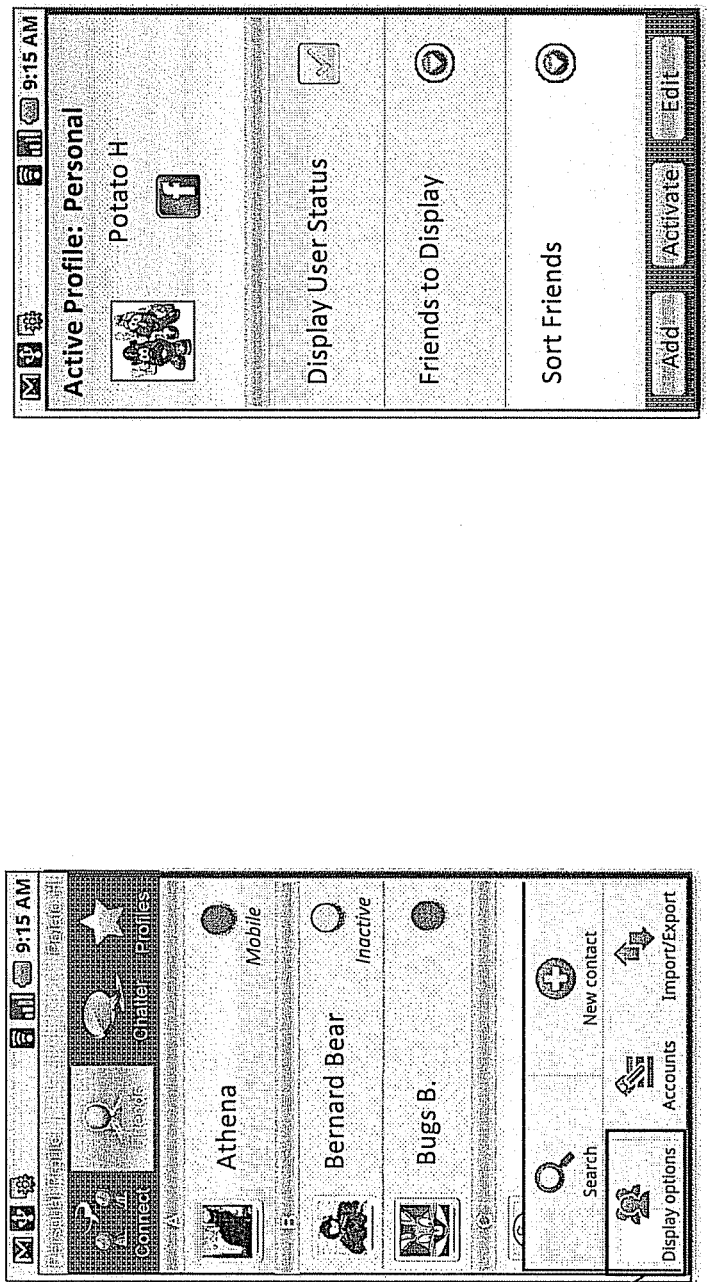

3000 ically managing and blending communications of a user of social networking services. More particularly, the subject matter described herein relates to methods, systems, and computer readable media for managing multiple personas within end user applications.

METHODS, SYSTEMS, AND COMPUTER READABLE MEDIA FOR MANAGING MULTIPLE PERSONAS WITHIN END USER APPLICATIONS

TECHNICAL FIELD

The subject matter described herein relates to methods and systems for dynamically managing and blending communications of a user of social networking services. More particularly, the subject matter described herein relates to methods, systems, and computer readable media for managing multiple personas within end user applications.

BACKGROUND

Social networking tools and services have become a widely used means for many people to connect and communicate. A person may interact with friends, family members, coworkers, potential clients, interest groups, etc., using popular social networking sites, such as Facebook®, Twitter®, YouTube®, or LinkedIn®, to name a few.

A person may be a user or subscriber of a number of these and other over-the-top (OTT), SIP, IP multimedia subsystem (IMS), voice-over-LTE (VoLTE), and other telecommunication services. Users may use some services to communicate only with personal or professional contacts, with no overlap, or they may choose to have a great deal of overlap with contacts and services. Users may prefer to keep their communications separate or to maintain their privacy, and to use the same services with different contact groups, they may need different login IDs or usernames.

The versatility of social networking technology contributes to its popularity and widespread use by people of all ages. However, there are disadvantages associated with having so many options to choose from when it comes to which services to use and how best to manage those services. Many people use the same device or devices across the different roles that they assume during their daily lives. A user may have the role of "dad" or "husband" with his family, "boss" or "employee" at work, and "best friend" or "college buddy" in his personal life. A user may utilize different services, different social networks, and in many cases, different identities across these different roles. With existing technology, users must manage these different personas and corresponding profiles manually, which may involve remembering multiple passwords, keeping track of and logging into different social networks, switching identities, configuring different contacts and managing multiple photos. Users may be required to run separate applications for different communication services, or to manually switch between these applications to reach their various social communities.

Accordingly, in light of the disadvantages associated with manually managing social networking identities and applications, there exists a need for methods, systems, and computer readable media for managing multiple personas within end user applications.

SUMMARY

Methods, systems, and computer readable media for managing multiple personas within end user applications are disclosed. According to one method, a first profile definition defining a first persona through which a user accesses at least one social networking, OTT, or other hosted service and at least one trigger condition associated with the activation of the first persona is accessed. The method further includes determining a context for the user. The method further includes determining whether the context for the user satisfies the at least one trigger condition. In response to determining that the context satisfies the at least one trigger condition, the first persona is activated.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which:

FIGS. 24-27 are computer screenshots illustrating exemplary user interfaces associated with the displaying of friends from a different profile by a system for managing multiple personas within end user applications according to an embodiment of the subject matter described herein.

DETAILED DESCRIPTION

Figure 1:
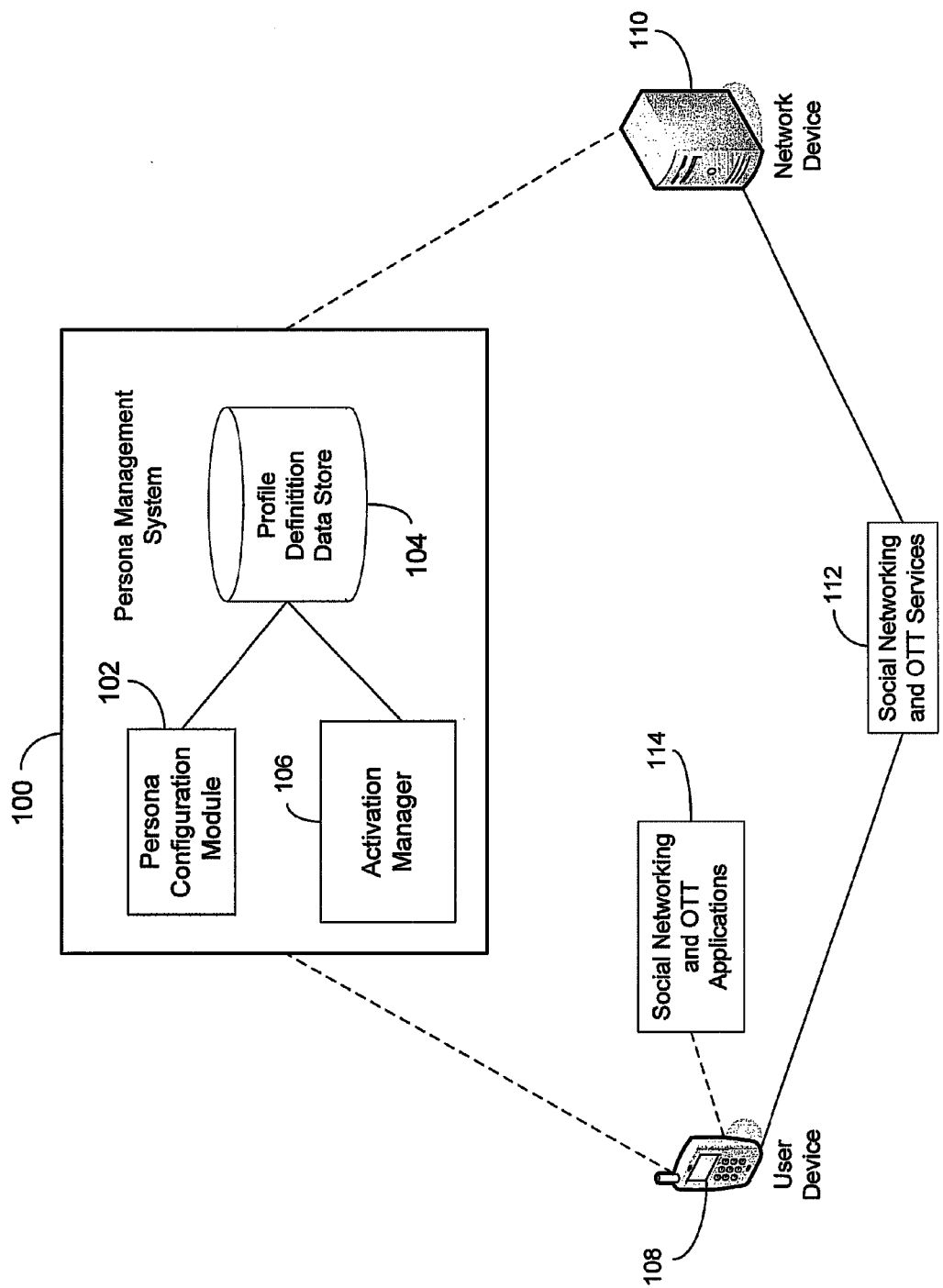
FIG. 1 is a network diagram illustrating an exemplary system for managing multiple personas for a user of a social networking service according to an embodiment of the subject matter described herein.

In accordance with the subject matter disclosed herein, methods, systems, and computer readable media are provided for managing multiple personas within end user applications. The subject matter described herein introduces a persona and associated profile capability to communication-oriented applications. It allows a user to utilize the same communication device or application across the various roles, or personas, that the user assumes in the different contexts in which the user uses his or her device or applications. The subject matter described herein also allows personas and profiles to be used across plural user devices. For example, the same personal persona can be used on a user's smart phone, home PC, and television. To enable cross-device utilization, the persona management system described herein may be implemented on a network server that is accessed by the plural devices. Furthermore, the subject matter described herein allows the user to define unique IDs for each persona, also called a profile, and to define a set of rules that specify the friends, services and external applications that are normally used within each profile. These services may include standard telephony capabilities (e.g. voice, video and messaging services) or may also include OTT and social networking services. Each profile also contains a set of activation policies that determine which persona or profile is active at different times and under different conditions. Users may define how their identities, native telephony services and externally provided services should be integrated and mashed-up into a blended user experience. The end user also may configure his or her own persona identities, including anonymous or alias persona identities. This may allow users to provide themselves with additional privacy when interacting with OTT services, for example.

A user's profiles may be activated automatically in response to activation rules being satisfied or manually activated by the user. A profile definition is a construct that stores profile identification information, activation or trigger conditions, and corresponding social networking capabilities to be activated. The combination of trigger conditions and a corresponding service to be activated is referred to herein as an activation rule. These rules may include both static and dynamic conditions, identities and login credentials for accessing other applications (e.g., OTT and social networking applications), rules for aggregating capabilities and data across different applications (e.g., presence aggregation) as well as interoperability rules for interworking across different applications (e.g., rules that define how status updates should be posted across SIP presence, Facebook® and Twitter®).

The profile definition may be populated from both static device or application information, as well as or alternatively from information extracted from dynamic sources, such as other applications or network hosted services. The profile definition may be traversed to determine whether the currently active user context satisfies the activation rule, which may be used to influence the services and user experience provided by the communication device or applications. The profile definition may also be used to identify and propagate information or communications across different applications. For instance, if a user publishes content or context information (e.g., the user's location), the profile definition may be traversed to identify the various OTT and social networks to which that content should be automatically shared. For example, a user's profile definition may define that a "Status Post" should be published as SIP presence, as a Twitter® tweet and as a Facebook® wall post. When the user enters a new status message, it is automatically posted to the three services.

In another example, a user may choose to specifically push the user's GPS location to someone with whom the user is involved in a "conversation" via IM, VoIP, Twitter®, etc. The user may utilize the profile rules associated with the user's currently active persona to define how location information should be shared, as well the privacy rules and restrictions that they wish to enforce to protect their sensitive location information. The profile definition for the user's currently active persona may define the location information format and how that location information should be shared (e.g., Google® Maps URL, geo-coded location, etc.), who is allowed to see that information and any user-defined privacy restrictions. Thus, the subject matter disclosed herein may give a user control of "social location" information (as opposed to blindly broadcasting), regardless of the communication application that is being used to share the information.

Example scenarios in which social location push control may be useful include:

- A is supposed to meet B at restaurant X, but A can't find X (wrong address, X moved, out of date maps, etc.). A IM's/Texts B "where are you?" and B hits Location Push to A. Persona management system 100 illustrated in FIG. 1 may then review the profile definition for B's currently active persona, determine that B's social location can be communicated to A via a Google® maps URL sent to A via IM service. A is then able to find and meet B.
- A just flew into a foreign country and is supposed to meet B for a sales prep meeting. A does not speak the language, so the signs are unreadable. A calls B and asks, "where are you?" B does Location Push to A. In response to receiving the location push, persona management system 100 may review the profile definition for B's currently active persona, determine that B's social location can be pushed via a Google® maps URL sent to B via a Facebook® post. A shows the post to the taxi driver, who is then able to take A to B.
- You and group of friends are planning to stake out a spot to watch the big parade. A finds the perfect spot (on top of a building) and does a Location Push to the rest of the group. In response to the location key, persona management system 100 may review the profile definition for B's currently active persona, determine that B's social location can be communicated the group via a Facebook® post and posts B's social location to the rest of the group via the Facebook® post.
- A is lost (got off at the wrong stop, made a wrong turn out of the mall, etc.) and calls home to be picked up. A uses Location Push (under A's control) to communicate where A is located to parents or friends who might be able to pick A up. In response to A selecting location push, persona management system 100 may read the profile definition for A's currently active profile and push A's location via street address or GPS coordinates to friends via Facebook® as specified in the profile definition.

Reference will now be made in detail to exemplary embodiments of the present invention, examples of which are illustrated in the accompanying drawings. Wherever possible, the same reference numbers will be used throughout the drawings to refer to the same or like parts.

FIG. 1 illustrates an exemplary persona management system that allows a user to define and utilize personas according to an embodiment of the subject matter described herein. Referring to FIG. 1, persona management system 100 includes a persona configuration module 102 that receives profile definitions and stores the definitions in profile definition data store 104. An activation manager 106 determines the current context for a user, analyzes trigger conditions associated with profile definitions stored in data store 104 and activates the corresponding persona or personas. Persona management system 100 may be stored or implemented on a user device 108, a network device 110, or a combination of user device 108 and network device 110. User device 108 may be a mobile phone, a personal computer, a smart phone, a networked television, or any other device by which a user interacts with social networking and OTT services 112. User device 108 may include social networking and OTT applications 114 through which the user accesses social networking and OTT services 112. Activation manager 106 may function as a front and to determine which of applications 114 are active according to the user's context and the profile definitions, how friends and contact lists from the active applications are merged, and how communications initiated by the user are disseminated to the active applications. Network device 110 may be any device in the network that is suitable for managing user access to social networking and OTT services 112. In one example, network device 110 may be a server that manages the user's personas across multiple social networking or OTT services 112. Such a server may be an HTTP server accessible via the Internet or a server that implements any other suitable protocols for managing communications between user device 108 and social networking and OTT services 112.

Figure 2:
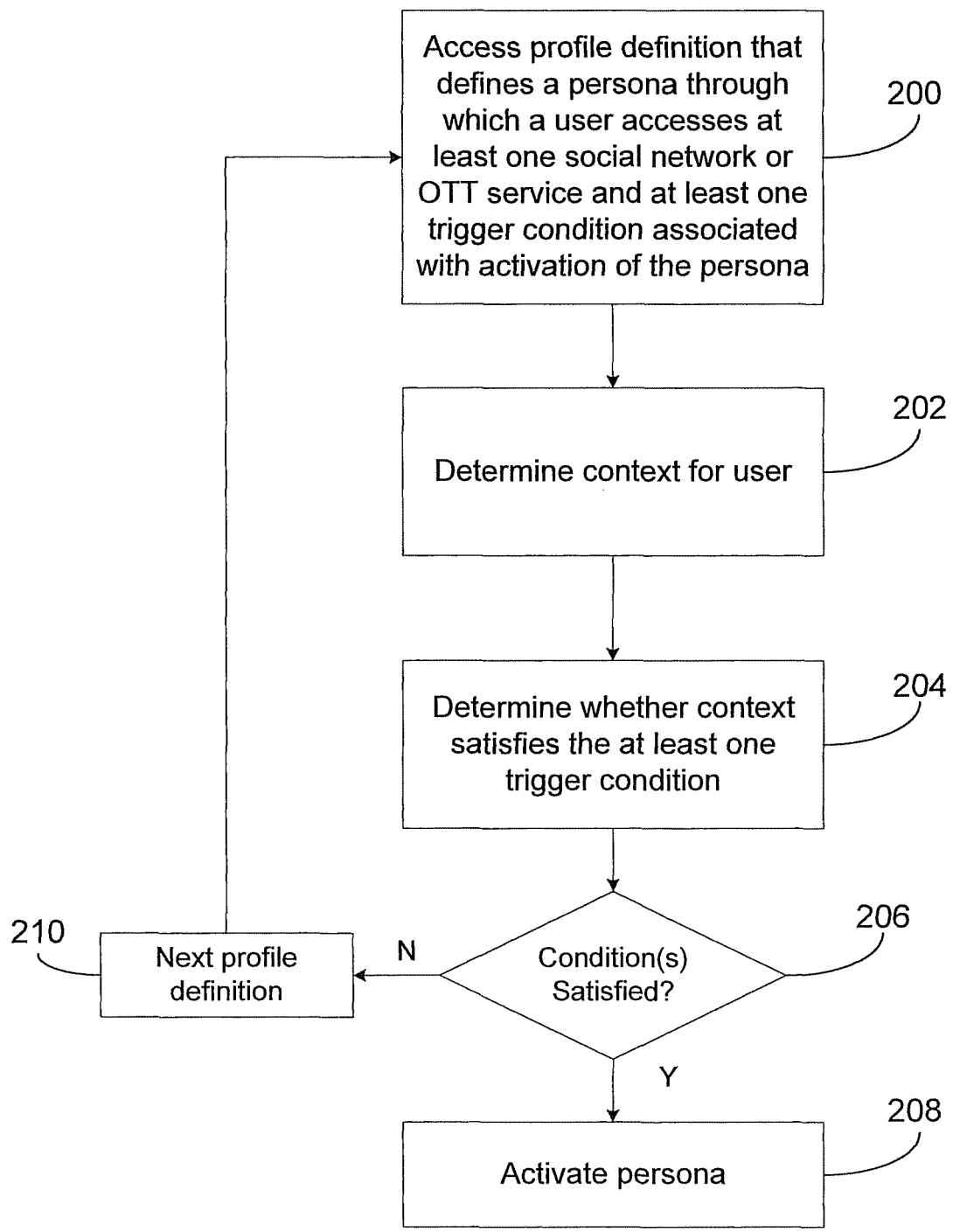
FIG. 2 is a flow chart illustrating an exemplary process for managing multiple personas for a user of a social networking service according to an embodiment of the subject matter described herein.

FIG. 2 is a flow chart illustrating exemplary steps for managing personas for a user of social networking services according to an embodiment of the subject matter described herein. Referring to FIG. 2, in step 200, a profile definition that defines a persona through which a user accesses at least one social networking or over the top (OTT) service and the corresponding trigger conditions associated with the activation of the persona is accessed. In FIG. 1, activation manager 106 may access a profile definition stored in profile definition data store 104. The profile definition may define a persona for a user, such as "work," while the user is at work. The profile definition may specify trigger conditions for activating the persona. For example, a work persona may be activated when the user is physically within the premises where he or she normally works and during normal work hours. The profile definition may also specify which social networking or OTT services to activate when the user is at work. For example, a user's work persona profile definition may specify that the user is to be connected to a work email account, a work telephone number and a professional social networking service, such as LinkedIn®.

Returning to FIG. 2, in step 202, the current context of the user is determined. In FIG. 1, activation manager 106 may determine the time of day, location, IP address, or other factors that define the context of the user. Activation manager 106 may obtain the context information from user device 108 or from the network. For example, time information can be obtained from a network time service or from a clock within user device 108. Location information can be obtained from a GPS chip within user device 108 if user device 108 has GPS functionality. If user device 108 does not have GPS functionality, location can be determined using triangulation or by mapping the current IP address of user device 108 to a physical location. IP address information of user device 108 can be obtained by executing a command, such as ipconfig, to read the device's assigned IP address. Combinations of context information may be used to determine whether the trigger conditions are satisfied. Continuing with the present example, the IP address, time of day, and location may be used in combination to determine whether the at work persona is activated.

Returning to FIG. 2, in steps 204 and 206, it is determined whether the context satisfies the trigger condition or conditions associated with activation of the persona. In FIG. 1, activation manager 106 may determine whether the trigger conditions associated with the current profile definition are satisfied by the current context. This may be performed by comparing the context information collected form the user's phone, PC, or other communication device and comparing the information against trigger conditions specified in the profile definition. Returning to FIG. 2, if it is determined that the current context satisfies the trigger condition or conditions, control proceeds to step 208 where the persona is activated. Returning to FIG. 1, activation manager 106 may activate the persona corresponding to the satisfied trigger conditions. For example, if the persona is defined for a user when the user is at work during work hours, activation manager 106 may activate the user's at work persona.

Returning to FIG. 2, in step 206, if the corresponding trigger condition or conditions are not satisfied, control proceeds to step 210 where the next profile definition for the user is accessed and steps 200 through 206 are repeated for the next profile definition. Also, in step 208, if the persona is activated, control may also proceed to step 210 to analyze the next profile definition. Multiple personas may be simultaneously active. For example, activation manager 106 may determine that the trigger condition or conditions associated with the next profile definition are also satisfied and may simultaneously activate the first and second personas. A user may have an at work profile and a dad profile that are simultaneously active if the user is at work and normal business hours have concluded. Alternatively, activation of a second profile may automatically deactivate the first profile. If two profiles are simultaneously active, activation manager 106 may disseminate information from the user according to a merged set of rules for the activation profile.

In one example where trigger conditions associated with different profiles are simultaneously satisfied, activation manager 106 control distribution of information according to the merged set of dissemination rules associated with the profiles. For example, when a user is simultaneously "at work" and "dad," any posts made through activation manager 106 may be transmitted to the user's family via Facebook® and to the professional connections via LinkedIn®. Thus, activation manager 106 may function as a front end for plural social networking services and/or applications when multiple personas are simultaneously active or when a given persona contains multiple different social networking services as communications media. In this example, the Facebook® users would see the post as coming from dad and the LinkedIn® users would see the post as coming from John at work.

Activation of a persona or profile may include registering with the various external networks as defined in the profile definition and may also involve registering for profile change notifications or initializing local reporting services to allow local applications and external networks to keep in sync with each other's profile changes. Since the profile definition can be described with a data description language, it is possible to reload a previously saved version of the profile data or alternatively, load a profile that was created and saved on a different device. It is also possible to use the subject matter described herein to create a network based profile proxy service which remains active at all time and keeps the profile synchronized with all of the user's social communities. In this case, the activation or initialization step may simply involve downloading the most recent version of the profile from the network server.

Activation of a persona may involve traversing each of the applications configured on the user's communication device for social networking or OTT services defined for the persona and using the configured identities and credentials to login to the external services, OTT and social networks associated with that persona. The external services associated with a persona are not limited to OTT and social networking services. A persona may also be configured to allow the user to access telecom and enterprise services as well. For example, the services associated with a persona may include access to a user's voice over IP telecommunications service. Any hosted service is intended to be within the scope of the subject matter described herein. As used herein, the term "hosted service" refers to a communications service provided to a user using one or more computers that are hosted or controlled by a third party, such as a telecommunications network operator. Corresponding friend aggregation rules may be applied to dynamically construct a friend list for the user's persona. These rules may define which friend data should be extracted from different external services, how it should be merged into a blended friend definition and how this data should be presented on the end user's display.

Figure 3:
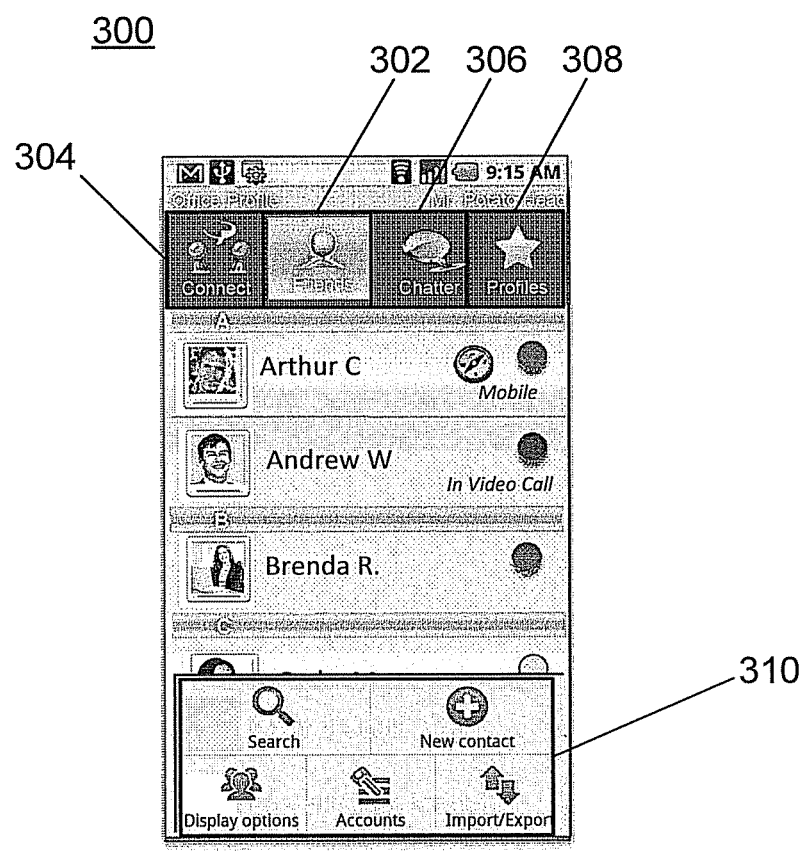
FIG. 3 is a computer screenshot illustrating an exemplary user interface associated with the management of multiple personas according to an embodiment of the subject matter described herein.

FIG. 3 is a computer screenshot illustrating an exemplary graphical user interface that may be generated by persona management system 100 and displayed on a user device according to an embodiment of the subject matter described herein. Interface 300 displays a user's friends when the user activates a friends tab 302. Friends tab 302 allows the user to see a blended, unified phonebook and OTT and social network friend list. The contents of the user's friend list are derived and displayed from the aggregation rules defined by the user as part of the user's personas. The friends list associated with a persona is derived by accessing all of the friends explicitly defined in the profile definition, as well as aggregating all of the user's friends within the specified OTTs and social networking sites. The resulting friends list is a dynamic blended friends list. Accordingly, when a user adds removes a friend from one of their social networks, the change is automatically reflected in the user's blended friends list.

Other tabs of the interface 300 may include a connect tab 304, a chatter tab 306, and a profiles tab 308. A user may publish the user's status, publish the user's location, or access services, such as voice over LTE (VoLTE), video, and OTT services, via connect tab 304. Chatter tab 306 may display social interaction history, active conversations, or a communication launch pad. A user may perform actions, such as viewing, adding, or editing the user's profiles or personas via profiles tab 308. Users may also activate different profiles using this tab. A context-sensitive overlay menu 310 may give the user access to user features, such as search, add a contact, display options, accounts, and import/export features.

Figure 4:
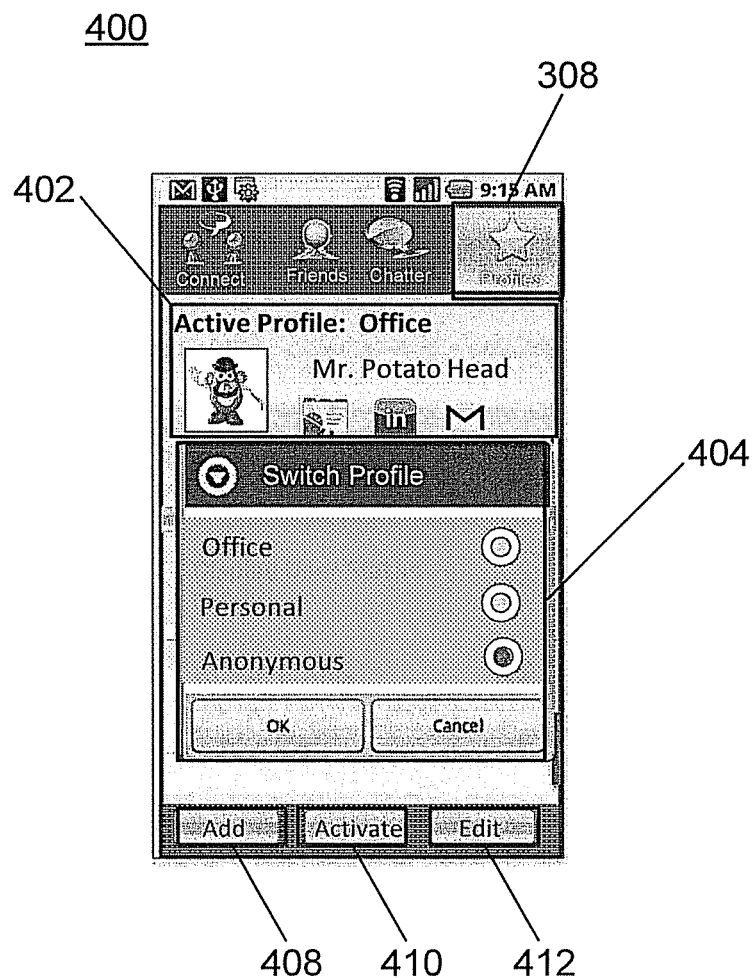
FIG. 4 is a computer screenshot illustrating an exemplary profile tab of a user interface for managing multiple personas within end user applications according to an embodiment of the subject matter described herein.

FIG. 4 is a computer screenshot illustrating an exemplary graphical user interface that may be displayed by persona management system 100 when the user selects profiles tab 308 according to an embodiment of the subject matter described herein. Interface 400 shows that a user may use profiles tab 308 to view the currently active profile or persona 402 or to change profiles. In one embodiment, switch profile box 404 allows the user to choose to manually override the currently active profile 402 with another profile or persona. A user may also use profiles tab 308 to add new profiles via button 408, manually activate a profile via button 410, or edit existing profiles via button 412.

Figure 6:
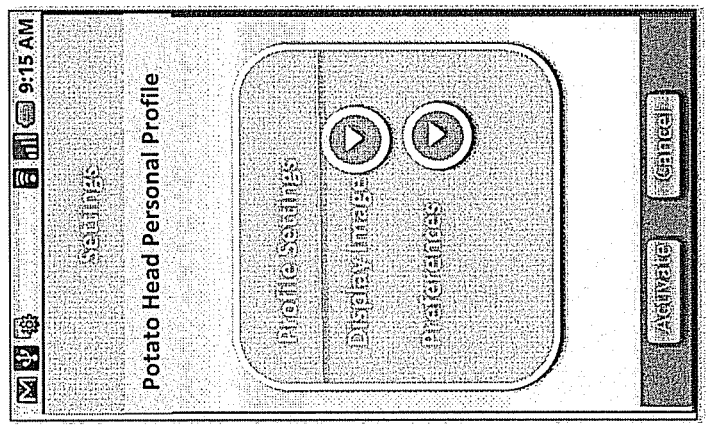
FIGS. 5-16 are computer screenshots illustrating creation of a new profile using user interface for managing multiple personas within end user applications according to an embodiment of the subject matter described herein.
Figure 5:
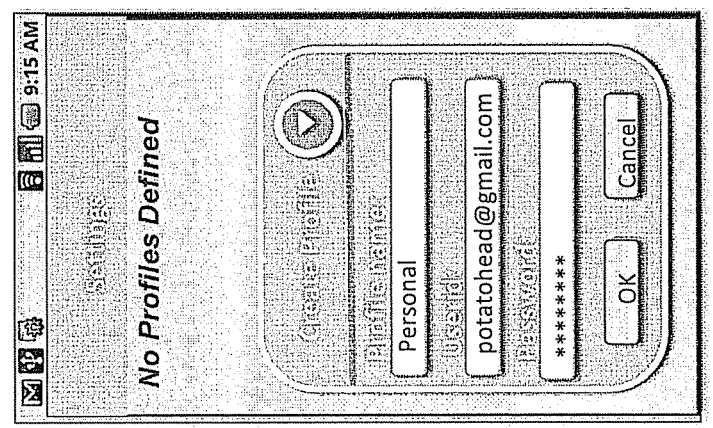

FIGS. 5-16 are computer screenshots illustrating exemplary interfaces that may be displayed by persona management system 100 for creation of a new profile according to an embodiment of the subject matter described herein. Using interface 500 in FIG. 5, the user, Mr. Potato Head, creates a new personal profile. Persona management system 100 may require the user to input a profile name, such as Personal or Office, as well as authentication credentials. In the illustrated example, the user has inserted an email address as the user ID and typed the password. Once the user has defined the user ID and password for the persona, the user selects OK on the interface in FIG. 5 and persona management system 100 may display the interface illustrated in FIG. 6. In FIG. 6, the user, Mr. Potato Head, begins configuring and personalizing his new Personal profile. Settings the user may choose to configure may include a display image and other preferences. The user may also choose to activate the profile.

Figure 8:
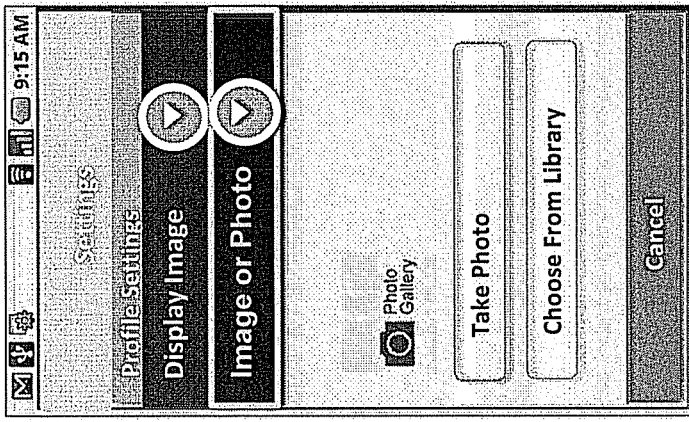
Figure 7:
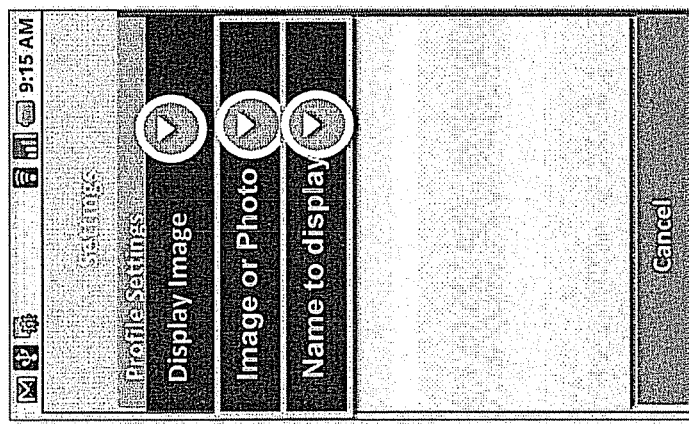

Once the user has selected a name and authentication credentials for the profile, persona management system 100 may prompt the user to select display options to be displayed on the user's device for the profile. FIGS. 7 and 8 illustrate exemplary user interfaces that may be presented by persona management system 100 for configuring display options for a profile. In FIG. 7, interface 700 allows a user to select options for creating a display image, photo, and name. FIG. 8 illustrates an example of interface 800 that is presented when the user selects the image or photo tab in FIG. 7. In FIG. 8, the user is prompted to take a photo or select a photo from a library. Once selected or taken, the photo will be associated with the persona and displayed when the persona is active.

Figure 10:
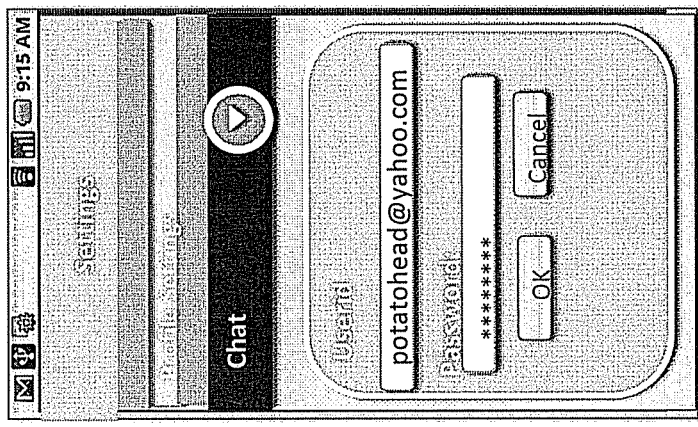
Figure 9:
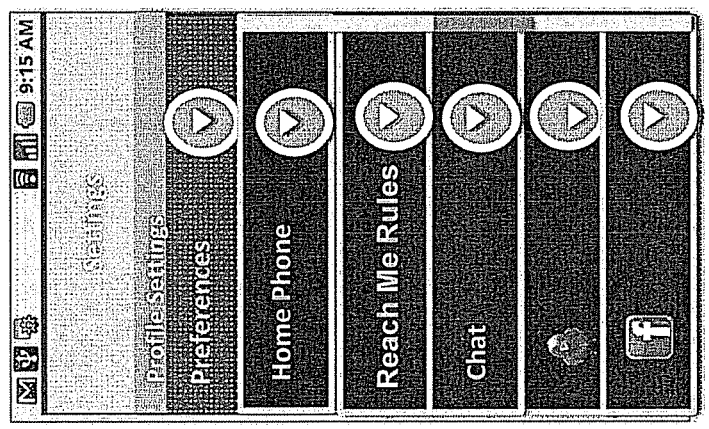
Figure 11:
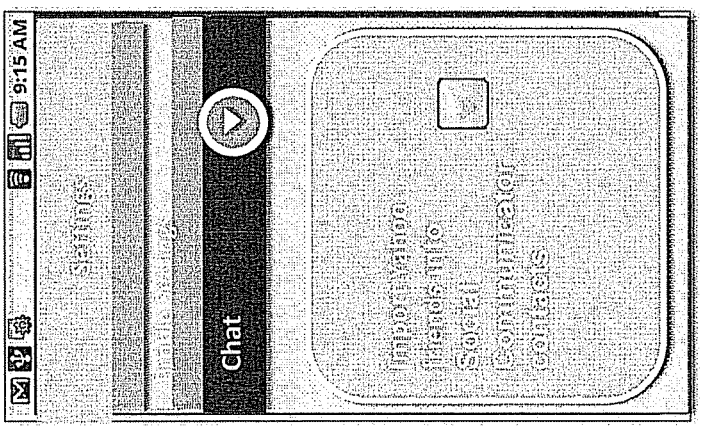

As set forth above, persona configuration module 102 allows a user to configure various settings, including communication modes for a persona. FIG. 9 illustrates interface 900, in which the user may select and configure different communication modes, such as Twitter®, Facebook®, or Yahoo® chat. In this example, it is assumed that the user wishes to include Yahoo® chat as a communication mode for the profile and selects the chat configuration button. FIG. 10 shows the resulting interface 1000 that is displayed when the user selects the chat configuration button in FIG. 9. Using interface 1000, the user, Mr. Potato Head, provides a user ID and password for accessing the user's Yahoo® chat account. FIG. 11 shows interface 1100, in which the user may choose to import his Yahoo® friends into the user's contacts for the persona being defined.

Continuing with the example, when the selects OK on the interface displayed in FIG. 10, interface 1100 illustrated in FIG. 11 for importing Yahoo® friends as contacts for the persona being created may be displayed. In FIG. 11, because the user is configuring the persona for Yahoo® chat communication capabilities, persona configuration module 102 may provide the user with the option of importing Yahoo® friends as contacts for the persona. By selecting the check box illustrated in interface 1100, the user may automatically import the user's Yahoo® contacts into the profile definition for the persona.

Figure 12:
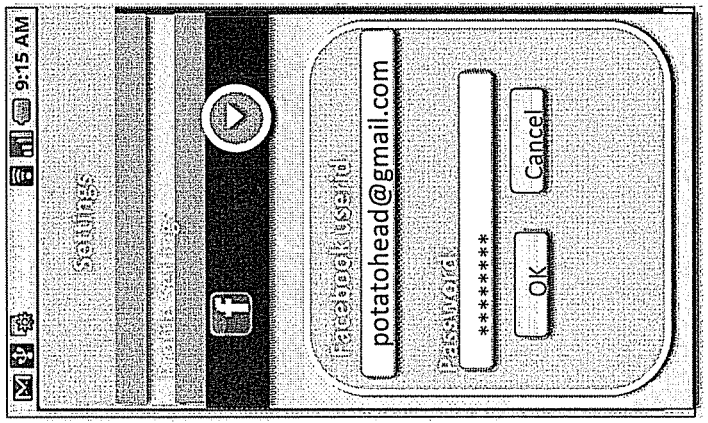

As indicated above, a given profile or a persona may include access to plural social networking sites or services. In this example, it is assumed that the user accesses the Facebook® button illustrated in FIG. 9 and configures the profile to access the user's Facebook® account. FIG. 12 illustrates an interface 1200 where the user or the Facebook® application on the user device provides his Facebook® user ID and password for the profile. Once the user or the Facebook® application on the user device provides the Facebook® user ID and password and the user selects OK on the interface in FIG. 12, persona configuration module 102 may display interface 1300 illustrated in FIG. 13 where the user is presented with the option of importing the user's Facebook® friends as contacts for the profile. By selecting the check box, the user can import the user's Facebook® contacts or friends as contacts for the profile.

Figure 14:
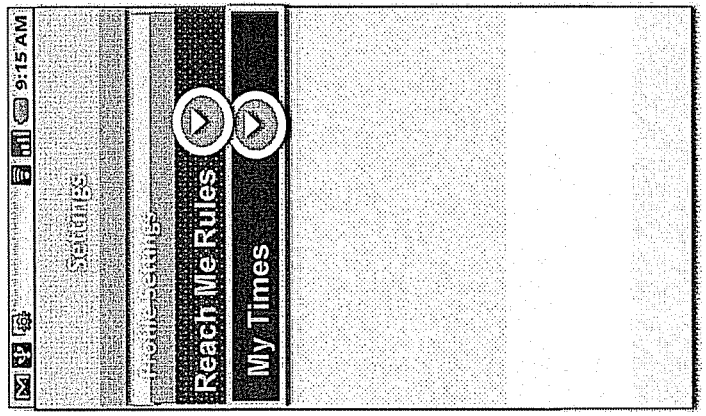
Figure 13:
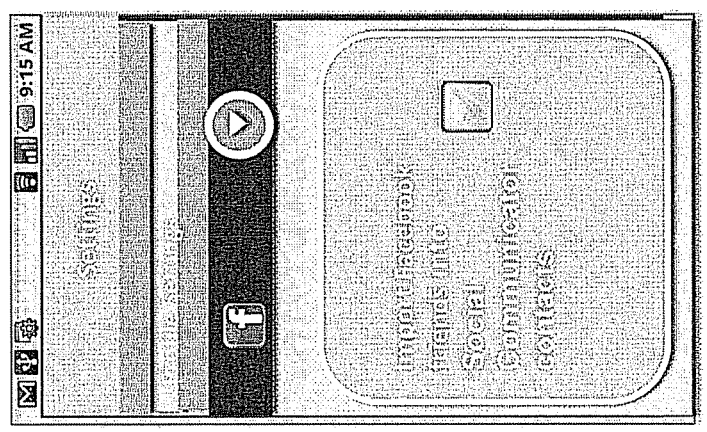
Figure 16:
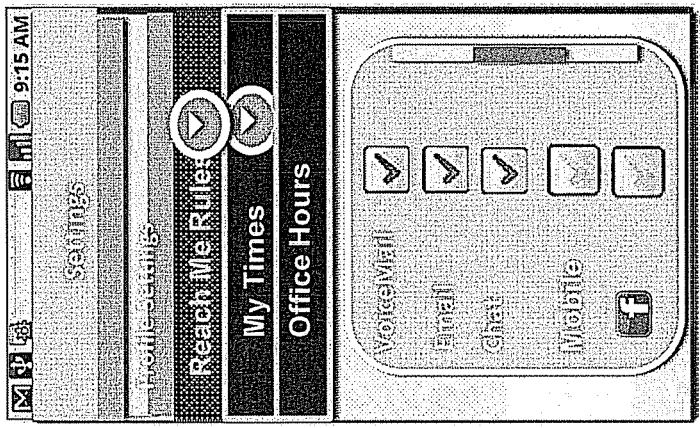
Figure 15:
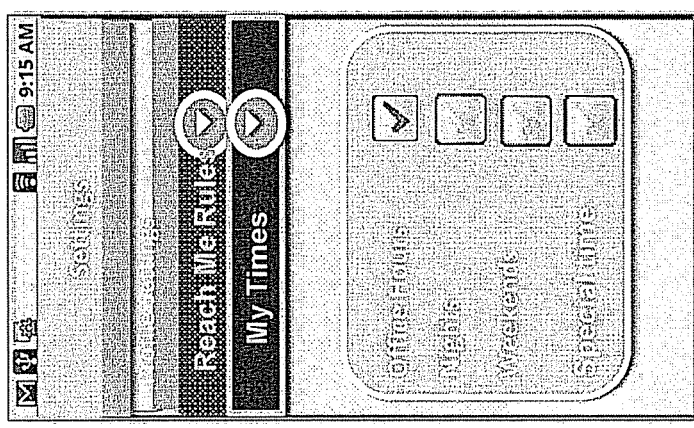

Returning to FIG. 9, another aspect of the subject matter described herein allows the user to define reach me rules and times during which a given profile persona is activated. FIGS. 14 through 16 illustrate exemplary interfaces where the user selects reach me rules and times for the profile being defined. In FIG. 14, interface 1400 displays reach me rules and times buttons for the user to define rules and times for the profile. In FIG. 15, interface 1500 illustrates the results of the user selecting the times during which the profile will be activated. In the illustrated example, the user selects office hours as the times for the profile. In FIG. 16, the results of the user selecting the reach me rules button are displayed. In FIG. 16, interface 1600 allows the user to select ways that the user can be reached during office hours. In the illustrated example, the user selects voicemail, email, and chat as acceptable ways to reach the user during office hours. The user has not selected mobile or Facebook®. Once the user defines a profile, the profile definition may be stored in profile definition data store 104, which may be located in memory of user device 108 or network device 110.

Figure 18:
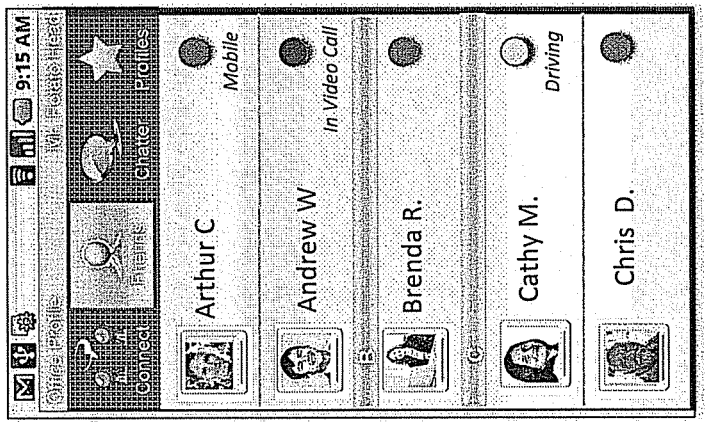
FIGS. 17-18 are computer screenshots illustrating exemplary user interfaces associated with the loading of a profile by a system for managing multiple personas within end user applications according to an embodiment of the subject matter described herein.
Figure 17:
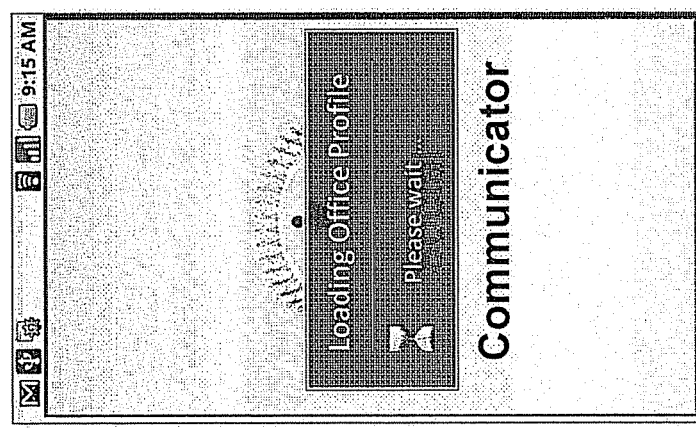

FIGS. 17 and 18 are exemplary computer screenshots that may be generated by persona management system 100 with the loading and activating of a profile. In particular, FIG. 17 illustrates an interface 700 that may be displayed when the user's office profile is loading. The office profile may be loaded and activated automatically by activation manager 106 at 9:15 A.M., as indicated by the time display in FIG. 17. FIG. 18 illustrates interface 1800 that displays the friend list associated with the user's office profile when the profile becomes active. As stated above, the friends list may be a merged friends list across plural social networking sites as defined by the aggregation rules in the profile definition.

Figure 19:
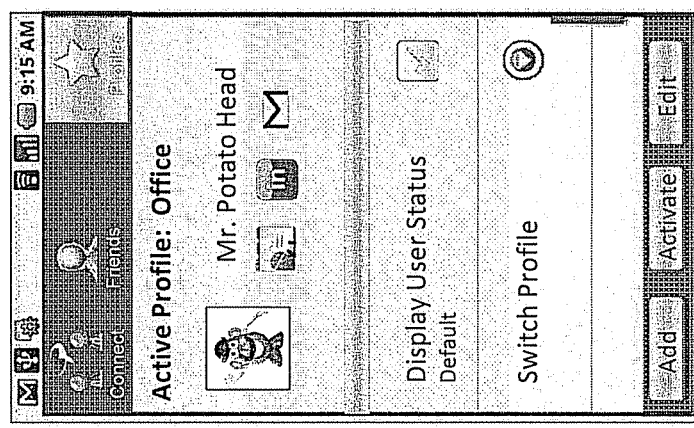

FIGS. 19-23 are computer screenshots illustrating interfaces that may be displayed by persona management system 100 to allow the user to manually override activation of a profile according to an embodiment of the subject matter described herein. In this example, it is assumed that the user decides to switch from his office profile to his personal profile, even though the user configured the dynamic trigger conditions to automatically activate the office profile during office hours. FIG. 19 shows interface 1900, in which the user is viewing the currently active profile and associated information. Here, the user's name is displayed as "Mr. Potato Head" because the active profile is his office profile. The services Mr. Potato Head uses with his office profile may include, for example, Android® services, LinkedIn®, and Gmail®. Wanting to switch from his office profile, Mr. Potato Head selects the Switch Profile option.

Figure 20:
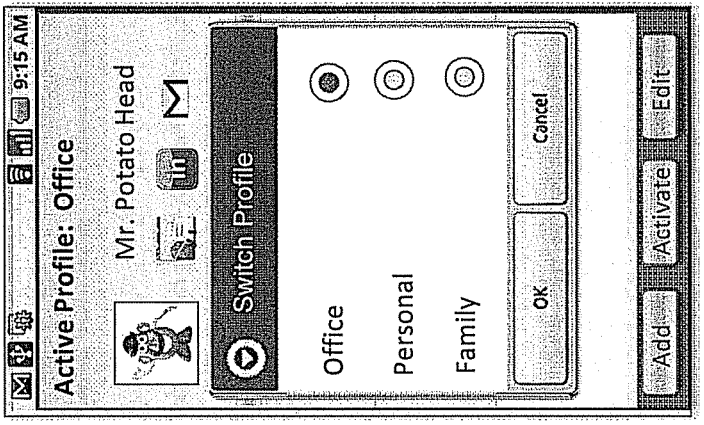
FIG. 19-23 are computer screenshots illustrating exemplary user interfaces associated with manual override of activation of a profile by a system for managing multiple personas within end user applications according to an embodiment of the subject matter described herein.
Figure 22:
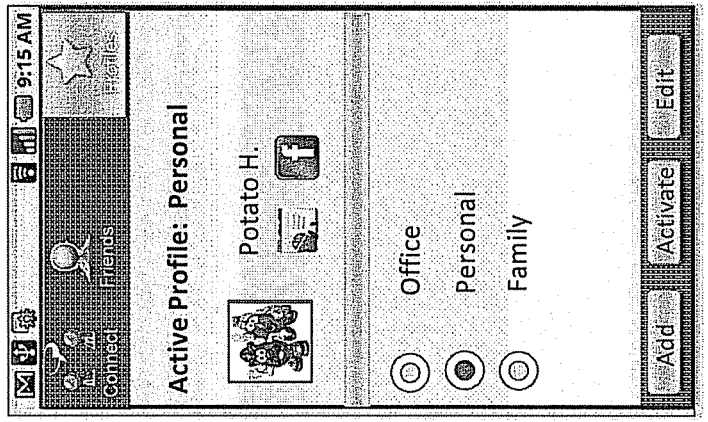
Figure 21:
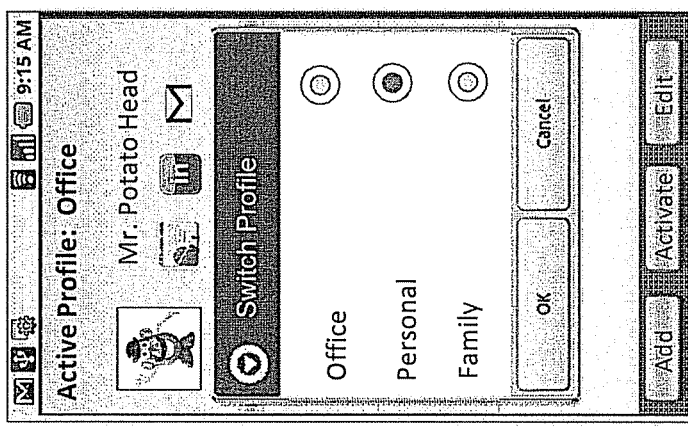
Figure 23:
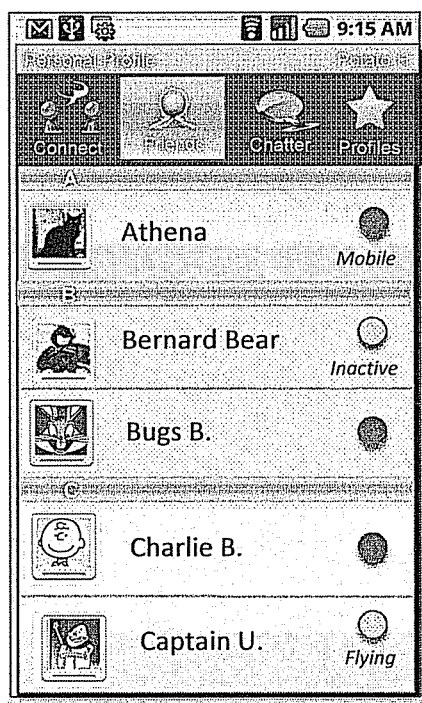
Figure 27:
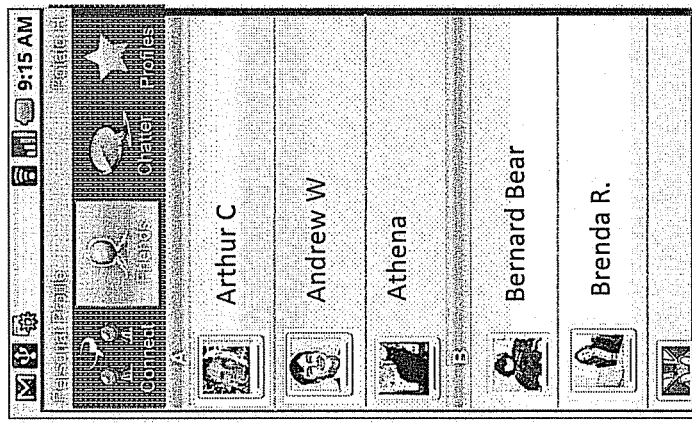
Figure 26:
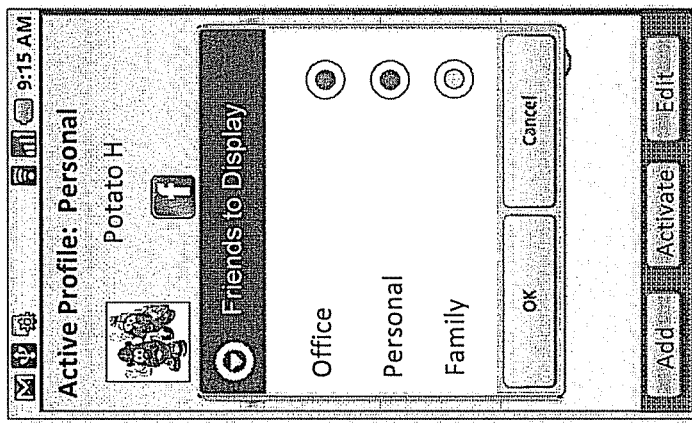

FIG. 20 shows interface 2000 where the active or office profile is selected in the Switch Profile box. FIG. 21 shows interface 2100 in which the user has selected to switch to a different profile, the personal profile. Note that the active profile is still the office profile. FIG. 22 shows interface 2200 in which the user's personal profile is activated. The user has configured his personal profile to display a different user image, now of Mr. and Mrs. Potato Head, and has also configured his name to display as Potato H. rather than Mr. Potato Head. The services Potato H. uses with his personal profile may include a different set of services than those configured for the office profile. FIG. 23 shows screenshot 2300, in which Potato H.'s personal friends list is displayed.

Figure 28:
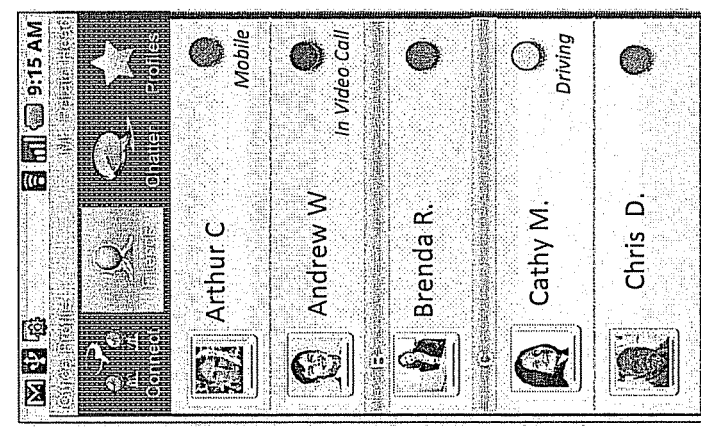

FIGS. 24-27 are computer screenshots illustrating exemplary interfaces that may be displayed by persona management system 100 for displaying and managing friends across different social networking services and end user applications according to an embodiment of the subject matter described herein. Continuing with the previous example, now that the user has switched from his office profile or persona to his personal profile or persona, the wants to display not only the friends from his personal profile, but also from his office profile. He also does not want his friends' presence status to be displayed. FIG. 24 shows interface 2400 in which the user selects display options button 2402 while viewing friends for a particular profile, FIG. 25 illustrates the resulting interface 2500 that is displayed when the user selects display options button 2402 illustrated in FIG. 24. In FIG. 25, the user is presented with options as to whether to display user status, select friends to display, and sort friends. When the user selects the friends to display button, control proceeds to interface 2600 illustrated in FIG. 26 where the user is presented with different groups of friends to display with the profile. In the illustrated example, the user has selected office and personal friends to display with the office profile but not family friends. Once the user selects OK on the interface illustrated in FIG. 26, control proceeds to the interface 2700 illustrated in FIG. 27 where the merged set of office and personal friends are displayed for the user's personal profile. Returning to FIG. 25, another option for the user to select with regard to the display of friends is display user status. If the user inserts a check in the display user status box, the status of each friend displayed in the profile is displayed, if available. Referring to FIG. 28, interface 2800 displays the communications status of each user.

Figure 29:
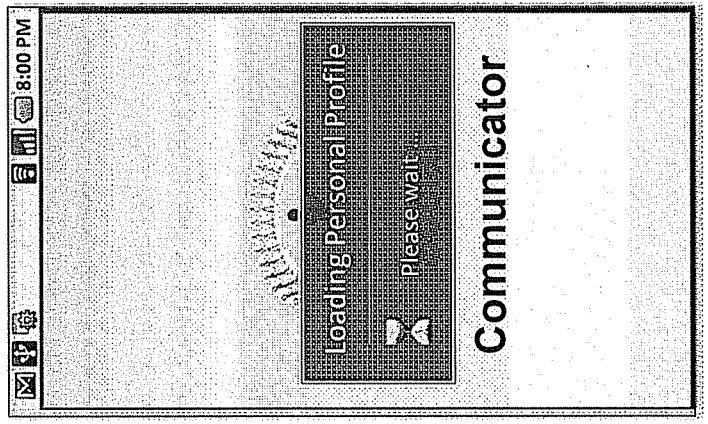
FIGS. 28-30 are computer screenshots illustrating exemplary user interfaces associated with the automatic switching of a profile by a system for managing multiple personas
Figure 30:
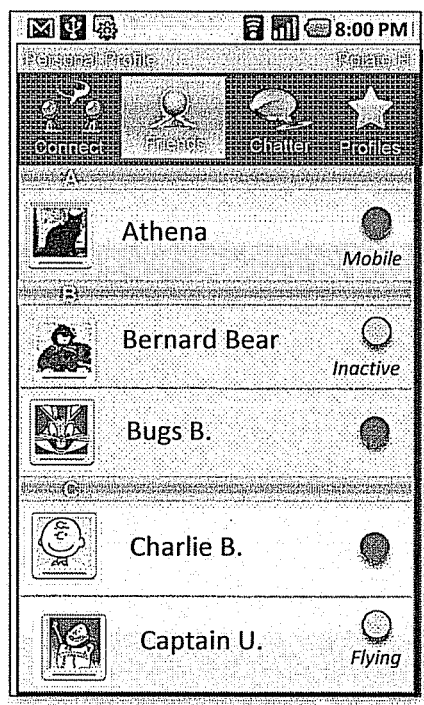

As stated above, profiles may be automatically activated and deactivated. FIG. 29 illustrates that at 8 P.M., the user's personal profile is automatically loaded. Loading of the personal profile may automatically deactivate the user's office profile. Alternatively, both profiles may remain simultaneously active. FIG. 30 illustrates the exemplary friends display 3000 that is associated with the user's personal profile. Thus, automatically switching between profiles may also include automatically updating the friends list that is displayed to the user.

It will be understood that various details of the subject matter described herein may be changed without departing from the scope of the subject matter described herein. Furthermore, the foregoing description is for the purpose of illustration only, and not for the purpose of limitation.

What is claimed is:

1. A computer-implemented method, comprising:
   accessing, via one or more computer systems, a first one of a plurality of profiles, wherein each of the plurality of profiles defines a set of one or more distinct communication services;
   accessing, via the one or more computer systems, at least one trigger condition associated with activation of the first profile;
   determining, via the one or more computer systems, a context for a user;
   in response to a determination that the context satisfies the at least one trigger condition, activating, via the one or more computer systems, the first profile;
   enabling a communication to or from the user, wherein the communication uses the set of one or more distinct communication services defined in the first profile; and publishing a location of the user according to a first setting associated with the first profile, wherein the first setting identifies a first location sharing service distinct from a second location sharing service identified by a second setting associated with a second one of the plurality of profiles.

2. The computer-implemented method of claim 1, wherein the at least one trigger condition includes a user IP address.

3. The computer-implemented method of claim 1, further comprising receiving, via the one or more computer systems, instructions from the user for manually overriding the activation of the first profile and manually overriding the activation in response to receiving the instructions.

4. The computer-implemented method of claim 1, further comprising determining, via the one or more computer systems, whether the context satisfies at least one trigger condition associated with the second profile and, in response to determining that the context satisfies the at least one trigger condition associated with activation of the second profile, activating the second profile.

5. The computer-implemented method of claim 4, further comprising de-activating, via the one or more computer systems, the first profile in response to activating the second profile.

6. The computer-implemented method of claim 4, further comprising maintaining, via the one or more computer systems, the first profile in the activated state when the second profile is activated so that the first and second profiles are simultaneously active.

7. The computer-implemented method of claim 4, wherein the first profile provides the user with access to a first contact from the set of one or more distinct communication services, and wherein the second profile provides the user with access to another contact from another set of one or more distinct communication services.

8. The computer-implemented method of claim 4, wherein the first profile defines a first social network and wherein the second profile defines a second social network distinct from the first social network.

9. The computer-implemented method of claim 4, wherein the first profile provides a first set or reach me rules and times during which the first profile is activated, and wherein the second profile includes a second set of reach me rules and times during which the second profile is activated.

10. The computer-implemented method of claim 1, wherein the set of one or more distinct communication services includes one or more of: a social networking, an over the top (OTT), or other hosted service.

11. A system, comprising:
at least one processor; and
a memory coupled to the processor, the memory configured to store program instructions that, upon execution by the at least one processor, cause the system to:
store a plurality of personas, each of the plurality of personas defining one of a plurality of different sets of one or more social networking services;
store a plurality of different trigger conditions, each of the plurality of different trigger conditions associated with activation of a different one of the plurality of personas;
determine a context for a user, wherein the context includes a combination of an IP address of the system and a physical location of the user;
determine whether the context satisfies a first trigger condition associated with a first persona;
in response to a determination that the context satisfies the first trigger condition, activate the first persona; and
enable a communication to or from the user, wherein the communication uses a social networking service defined by the first persona.

12. The system of claim 11, wherein the at least one trigger condition includes a visible network.

13. The system of claim 11, wherein the program instructions, upon execution by the at least one processor, further cause the system to receive instructions from the user for manually overriding the activation of the first persona and to manually override the activation in response to receiving the instructions.

14. The system of claim 11, wherein the program instructions, upon execution by the at least one processor, further cause the system to determine whether the context for the user satisfies a second trigger condition associated with a second persona and, in response to a determination that the context satisfies the second trigger condition, activate the second persona and enable another communication to or from the user, wherein the other communication uses a different social networking service defined by the second persona.

15. The system of claim 14, wherein the program instructions, upon execution by the at least one processor, further cause the system to deactivate the first persona in response to activating the second persona.

16. The system of claim 14, wherein the program instructions, upon execution by the at least one processor, further cause the system to maintain the first persona in the activated state when the second persona is activated so that the first and second personas are simultaneously active.

17. The system of claim 14, wherein the first persona allows the user to communicate with a first contact from a first one of the plurality of different sets of one or more social networking services, and wherein the second persona allows the user to communicate with a second contact from a second one of the plurality of different sets of one or more social networking services.

18. The system of claim 14, wherein the first persona provides a first set or reach me rules and times during which the first persona is activated, and wherein the second persona includes a second set of reach me rules and times during which the second persona is activated.

19. The system of claim 11, wherein the system is a component of a user device.

20. The system of claim 11, wherein the system is a component of a network device.

21. The system of claim 11, wherein the program instructions, upon execution by the at least one processor, further cause the system to present the user with a graphical user interface configured to generate personas of the user.

22. A non-transitory computer readable medium having stored thereon executable instructions that, upon execution by a processor of a computer, cause the computer:
access a first one of a plurality of profiles, wherein each of the plurality of profiles defines a distinct social networking, over the top (OTT), or other hosted service and at least one trigger condition associated with activation of the first one of the plurality of profiles;
determine a current context for a user, wherein the context includes at least one of: IP address or physical location of the user;
determine whether the context for the user satisfies the at least one trigger condition;

in response to a determination that the context satisfies the at least one trigger condition, activate the first one of the plurality of profiles; and publish a location of the user according to a first setting associated with the first profile, wherein the first setting identifies an instant message location sharing service distinct from a social network sharing service identified by a second setting associated with a second one of the plurality of profiles.

* * * * *